United States Patent Office 3,763,123
Patented Oct. 2, 1973

3,763,123
VINYL HALIDE INTERPOLYMERS
Jacques Abraham Waterman, Leonard Marshall Shorr, and Ilan Shaham, Haifa, Israel, assignors to Israel Mining Industries-Institute for Research and Development, Haifa, Israel
No Drawing. Continuation-in-part of abandoned application Ser. No. 808,652, Mar. 19, 1969. This application Dec. 29, 1970, Ser. No. 102,560
Claims priority, application Israel, Apr. 14, 1968, 29,817
Int. Cl. C08f 15/40
U.S. Cl. 260—80.7                                6 Claims

ABSTRACT OF THE DISCLOSURE

New solid addition copolymers with an extended branched chain structure comprise from 20 to 98% by weight of polymerized vinyl chloride and/or vinyl fluoride, at least one polymerized compound of the group of allyl halides, allylic hydrocarbons and alkyl substituted allylic hydrocarbons, and from 100 p.p.m. to 5% by weight of at least one polymerized compound characterized in its non-polymerized monomeric form by a carbon-carbon double bond which is asymmetrically substituted and conjugated with another double bond and by having a reactivity ratio $r_2$ relative to said vinyl chloride or vinyl fluoride larger than 3 and a reactivity ratio $r_1$ relative to said vinyl chloride or vinyl fluoride smaller than 0.5.

---

This is a continuation-in-part of co-pending application Ser. No. 808,652, filed Mar. 19, 1969, now abandoned.

The present invention concerns new polymers and their preparation. More specifically, the invention is concerned with chain extended polymers obtained by free radical initiation.

Known vinyl halogenide polymerization products suffer from disadvantages which may be in part overcome by introduction of an allylic comonomer. However, the use of allylic monomers in polymerization processes has given rise to limitations. The purpose of the present invention is to overcome these limitations.

Vinyl chloride homopolymers are known to be rigid materials characterized by a substantial resistance to chemical attack. However, resinous compositions containing only homopolymers of vinyl chloride have poor flow characteristics and are of poor stability under dynamic processing conditions and are, therefore, difficult to mould or to flux. Moreover, to overcome the relatively poor heat stability of vinyl chloride homopolymers, rigid resinous compositions thereof have to include stabilizing additives. Such additives are, however, not acceptable in all products, such as those which come in contact with foods and pharmaceuticals.

Attempts to improve the processing characteristics of polyvinyl chloride have involved the incorporation of so-called external plasticisers or the formation of polyblends, i.e. mixing the polymer with a plasticiser or with other polymers. However, all these procedures usually have proven unsatisfactory, be it because any improvement achieved was at the expense of sacrificing some other desirable physical properties, such as clarity, impact toughness, rigidity or chemical resistance, or be it because the products so obtained are economically unattractive for many applications because of the additional time-consuming post-polymerization formulation and compounding that are necessary.

In view of the above shortcomings of homopolymeric vinyl chloride, attempts to copolymerise it have been made in order to obtain in this way products of better properties. In accordance with one proposal, vinyl chloride is copolymerised with propylene. Thus, according to U.S. patent specification 3,468,859, vinyl chloride is copolymerised with up to 10% by weight and preferably 3 to 7% by weight of propylene and the products obtained are claimed to be rigid and to possess desirable processability. Similar products are also described by R. D. Deanin, "Vinyl Chloride-Propylene Copolymers," Society of Plastics Engineers, vol. 23, May 1967, p. 50, who shows that while, on the one hand, the molecular weight of the copolymer, measured by the intrinsic viscosity at diluted concentrations, depends on the propylene content, on the other hand at a temperature of 65° C., which is often encountered in the polymerization techniques, no useful products with suitable molecular weight can be obtained with a propylene content higher than 5%. Such a limitation of the comonomer restricts, however, a priori, the range of products that can be obtained in this way. This limitation is due to the chain termination property of propylene.

Another U.S. Pat. 3,117,110 actually claims polymers of ethylene, alkyl acrylate and propylene where the latter serves as chain terminator.

Another family of polymers, described in U.S. Pat. 3,501,440, is based on vinyl chloride-ethylene or vinyl chloride-ethylene-propylene. Although these products have a better processability than homopolymers of vinyl chloride they suffer from a relatively low heat distortion temperature which imposes a limitation on the uses of articles prepared therefrom.

It is also known that a vinyl chloride-ethylene copolymer even with a higher ratio of hydrocarbon comonomer group in the chain was less stable than a similar copolymer, in which propylene was used instead of ethylene. This was shown by thermo gravimetric analysis at 225-250° C. in air (ANTEC—Technical Papers, vol. XIII, pp. 43–56—Detroit, Mich., May 15–18, 1967).

In accordance with the present invention there are provided free radical initiated, chemically heterogeneous polymers of an extended branched chain structure comprising in the polymer molecule 20 to 98% by wt. of a polymerized vinyl monohalogenide compound in which the halogen is fluorine or chlorine (group A compound), at least one polymerized mono-olefin compound comprising in the non-polymerized monomeric form a skeleton grouping

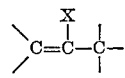

in which X is a hydrogen, halo or a carbyl radical, which monoolefin has the property of undergoing homolytic fission without fragmentation of the above grouping under conditions which normally give free radical initiation (group B compound), and 100 p.p.m. to 5% by weight of at least one polymerized compound characterized in its non-polymerized monomeric form by a carbon-carbon double bond which is asymmetrically substituted and conjugated with another double bond and by having a reactivity ratio $r_2$ relative to said group A compound larger than 3 and a reactivity ratio $r_1$ relative to said group A compound, smaller than 0.5 (group C compound).

In this specification and the appended claims, the term "carbyl radical" connotes any radical

i.e. a radical which is linked to the backbone through a carbon atom, irrespective of the substitution at this atom.

It is a characteristic feature of the present invention that the molar ratio of compound C in the polymer product is different from that in the monomer feed used for polymerization. This feature accounts for the so-called chemical heterogeneity of the product, i.e. for the fact that from a feed with a given molar ratio of compounds A, B and C polymeric increments of varying composition are formed at different conversion or residence times.

The reactivity ratios $r_1$ and $r_2$ of two monomers $M_1$ and $M_2$ are factors whose numerical value expresses the reactivity of the two monomers with respect to each other during copolymerisation. They are quantitative measures of the relative tendencies of the two monomers to add to a radical ending in one or the other monomer unit. Thus, a small value of $r_1$ ($r_1<1$) means that $M_2$ adds more readily than $M_1$ to a radical ending in an $M_1$ unit and a large value of $r_2$ ($r_2>1$) means that $M_2$ adds more readily than $M_1$ to a radical ending in an $M_2$ unit.

It is possible to determine the values of $r_1$ and $r_2$ from the copolymer composition as a function of the monomer feed composition which are in general related via the equation:

$$\frac{dM_1}{dM_2} = \frac{r_1 \frac{M_1}{M_2}+1}{r_2 \frac{M_2}{M_1}+ -}$$

where $dM_1/dM_2$ represents the molar ratio of the two monomers $M_1$ and $M_2$ in the increment of the polymer formed when the ratio of unreacted monomers is $M_1/M_2$. The former ratio obviously differs in general from the latter. Hence, in dependency on the molar feed ratio $M_1/M_2$ and on the values of $r_1$ and $r_2$, the unreacted monomer ratio will usually change as the polymerisation proceeds and this will give rise to a continually changing of the composition of the polymer being formed at each instant. Details on the methods for measuring $r_1$ and $r_2$ have been described in literature (M. Fineman and S. D. Ross, J. Polym. Sci., 5 (1950), 259) and tables of numerical values of $r_1$ and $r_2$ have been published.

In the following Table 1 are some figures of the reactivity ratio with respect to some monomers involved in the present invention. In the table $M_1$ stands for the group A compounds and $M_2$ for the group C compounds.

TABLE 1

[Reactivity ratios $r_1$ and $r_2$ with respect to vinyl chloride with $r_2 >3$ and $r_1 <0.5$]

| $M_1$ | $r_1$ | $M_2$ | $r_2$ |
|---|---|---|---|
| Vinyl chloride | 0.13 | Abietyl acrylate | 4.2 |
| Do | 0.027 | Acrylic acid | 8.2 |
| Do | 0.020 | Acrylonitrile | 3.3 |
| Do | 0 | Acrylamide | 19.6 |
| Do | 0.035 | Butadiene | 8.8 |
| Do | 0.01 | Chloroprene | 50 |
| Do | 0.10 | Methyl vinyl ketone | 8.3 |
| Do | 0.005 | 2,3-dimethyl butadiene-1,3 | 3.9 |
| Do | 0.01 | Itaconic acid anhydride | 7.5 |
| Do | 0.025 | Methacrylic acid | 36 |
| Do | 0.054 | Allyl acrylate | 3.04 |
| Do | 0.042 | Divinylbenzene | 7.67 |
| Do | 0.0385 | Ethylacid fumarate | 14.6 |
| Do | 0.18 | Vinyl trans cinnamate | 5.40 |
| Do | 0.12 | Ethylene glycol dichloroacrylate | 5.37 |
| Do | 0.050 | Ethylene glycol dimethacrylate | 19.8 |

Examples of families of the group C compounds are:

(1) Conjugated aliphatic α,β-unsaturated mono-, di- or tricarboxylic acids, acrylic acid, methacrylic acid, aconitic acid, half esters of olefinic dicarboxylic acids, e.g. of α,β-unsaturated dicarboxylic acids such as half esters of fumaric, itaconic acids, mono- or di-esters of olefinic tricarboxylic acids, e.g. of mezaconic, citraconic or aconitic acid, or chloro maleic acid, and the like.

(2) Conjugated nitrogen-vinyl monomers: acrylamides and substituted acrylamides, nitrogen substituted acrylic acid amides, e.g. non-substituted or substituted allyl acrylamides, N-substituted acrylamides, N-allyl acrylamides, N,N-diallyl acrylamides, N,N-dimethallyl acrylamides, acrylonitrile or substituted acrylonitrile, e.g. methacrylonitrile.

(3) Substituted and non-substituted acrylic acid esters of the formula

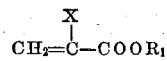

in which $R_1$ is an unsaturated organic radical and X is hydrogen, $CH_3$ or a

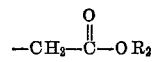

group wherein $R_2$ is an organic radical. Examples: abietyl acrylate, methallyl acrylate, allyl or methallyl esters of acrylic acid or of alpha (or beta) substituted acrylic acids, e.g. vinyl cinnamate, methallyl crotonate, methallyl cinnamate, allyl itaconates, allyl acrylate, methallyl acrylate, diethylene itaconate, glyceryl triacrylate, ethylene glycol diacrylate, ethylene glycol acrylate methacrylate, dimethallyl itaconate, diallyl itaconate, allyl esters of aliphatic conjugated oxycarboxylic acids with primary OH groups, conjugated dimers of substituted allyl acrylates.

(4) Di- or tri-vinyl substituted dicyclic or tricyclic homocyclic and heterocyclic aromatic compounds, e.g. divinyl α methyl styrene, divinyl toluene, divinyl naphthalenes, chlorinated divinyl naphthalenes, or divinyl tetrahydronaphthalenes, divinyl anthracene, divinyl benzenes, divinyl biphenyl, divinyl pyridines, divinyl thiophenes, divinyl dibenzo furans, divinyl furans, divinyl thiazoles, divinyl quinolines, and their related monomers and derivatives, e.g. halogenated derivatives.

(5) Conjugated 1,3-dienes, e.g. butadiene-1,3, isoprene, piperylenes, 2,3-dimethyl-butadiene-1,3, 2-vinyl cyclohexene, conjugated terpenes, halogenated butadienes, e.g. 2-chloro-butadiene-1,3,2-cyano-butadiene-1,3,1,3,5-hextriene.

(6) Allyl vinyl ketones and vinyl aldehydes, e.g. acrolein, methacrolein, methyl vinyl ketone, isopropenyl methyl ketone, vinyl aryl ketones, divinyl ketone, hydroxymethyl vinyl ketone, acetoxy vinyl methyl ketone, allyl ketones.

Examples of group B compounds are propylene, isobutylene, 1-butene, methyl-pentenes, amylenes, allyl chloride, allyl fluoride, allyl bromide, allyl cyanide, allyl alcohol and its esters.

From a structural point of view the new polymers can also be described by their branched chain extended form. This means that by addition of amounts of monomer C (100 p.p.m.—5%) branches are formed giving rise to an increase in the molecular weight and improvement of the processability of the polymer. This increase in the intrinsic viscosity of the new polymers may be due to the formation of chemical branching where the ramifications are formed due to the propagation of side chains (as for example when the monomer is allyl acrylate or divinyl benzene) or physical branching where the branches are formed due to association of polar groups (as for example when the monomer is acrylic acid or itaconic acid). However, although the polymers have branches, they are substantially noncross-linked. This absence of cross-linking also enables the polymer to be processed with the normal equipment. The composition of the monomers present in the new polymers can be varied in a broad range depending on the properties required. Monomer A will be generally in a range of 20% to 98% and preferably 50% to 98%. Monomer C is in a range of 100 p.p.m. to 5% and preferably 300 p.p.m. to 3%. However, in order to obtain the preferred properties of the polymer the amount of the monomer C is varied according to the family to which the monomer belongs. For example: using a monomer from the family of conjugated unsaturated acids, the amount will be in the range of 0.2% to 5%, whereas for allyl acrylate which belongs to acrylic acid esters family, the amount will be in the range of 0.015% to 0.2%. A person skilled in the art will easily adjust the amount of monomer C suitable for carrying out the polmerization using the intrinsic viscosity and the presence of a gel as criteria for this determination.

The invention also provides a process for the preparation of novel polymers comprising preparing a charge containing up to 98% by weight of one compound of group A, at least one compound of group B, at least one compound of group C in an amount of up to 5% by weight, and a polymerization catalyst, submitting the charge to conditions inducive of free radical initiation, allowing polymerization to proceed and recovering a polymer from the reaction mixture.

The polymerization may be carried out by any of the known techniques, e.g. suspension, emulsion, bulk or precipitation polymerization or polymerization in the presence of an organic liquid.

The term "precipitation polymerization" includes both heterogeneous bulk polymerization as well as polymerization carried out in a liquid which does not dissolve the polymer, and also covers cases in which the polymer is insoluble in the monomer mixture.

The pressure used in the course of the process is dependent on the vapour pressures of the monomers and other components employed, and on the polymerization temperature.

If desired, control of pressure and monomer feed control may be achieved by the bleed-off or feed-in of minor amounts of monomers A or B during the reaction.

The polymerization temperature may be varied within wide limits, for example, within the range of from $-70°$ C. to $+100°$ C. as is conventional with free radical initiated polymerization. Where the polymerization is carried out in aqueous suspension the preferred temperature range is from 0 to $75°$ C. Lower temperatures may be used if antifreeze compounds are added to the aqueous phase, e.g. methanol or glycol.

In accordance with one embodiment of the invention the total amount of all the compounds of groups A, B and C is incorporated in the initial charge. In accordance with another embodiment the compound(s) of group A and/or of group B and/or of group C is or are added continuously or in increments as the polymerization proceeds.

In accordance with yet another embodiment, only part of the groups A and B compounds are added initially together with the totally required amount of group C compounds(s), and the remainder of the groups A and B compounds are added subsequently as the polymerization proceeds. This procedure may in certain cases give rise to a further increase of the molecular weight.

When two group C compounds are used one of them may be added initially while the other is added to the reaction mixture as the polymerization proceeds. Alternatively, they may both be added initially.

The polymerization in accordance with the invention may be carried out batchwise, continuously or in steady state. Continuously the reaction may be carried out in a simple reactor like a pipe reactor or in a train of stirred reactors. The steady state embodiment may, for example, be achieved in a single stirred reactor.

Where the charge comprises a polymerization catalyst or catalysts, the latter can be selected from any of the systems which are known in the art to induce free radical initiation. The polymerization catalysts which produce free radicals may also be used in combination with another, non-free radical initiator, such as cationic catalyst. Thermal or physical excitation, such as photopolymerization or radiation-induced polymerization may be employed.

The invention enables to use a relatively high proportion of compounds of group B, which is of great advantage in view of the fact that these compounds are relatively cheap.

The novel polymers of this invention are generally characterized by a high molecular weight and are amenable to a desired molecular weight distribution. The molecular weight of the polymers according to the invention depends on the kind of group C compound chosen, its concentration and the reaction conditions employed. An additional particularly important feature of some of these polymers is their improved processability, heat stability, surface property and transparency.

The selection of the molecular weight distribution is important. A wide molecular weight distribution favours processability, but too high a concentration of low molecular weight fractions gives rise to a decreased strength and thermal stability. On the other hand too high a concentration of very high molecular weight fraction spoils processability and flow. These factors must be considered in view of the intended use of the product.

As the compound of group C comprises a conjugated system, modification of the polymer is possible by further reaction of the residual unsaturation or of the functional groups, e.g. further polymerisation, further chain branching, intermolecular reaction, association, salt formation and the like. The products obtained in this manner may be prepared into resinous compositions for moulding, extrusion, milling, calendering and other operations.

The polymers according to the invention may be pigmented. Any pigment commonly employed in colouring polyvinyl chloride compositions may be used and incorporated in the usual manner. Examples of such pigments are carbon black, titanium dioxide and the like, depending on the colour, if any, desired in the final product. This is especially important in cases where a high relative proportion of propylene or other group B compound(s) is or are used.

The novel polymers according to the invention may be compounded into resinous compositions employing fibrous or non-fibrous fillers. The fibrous fillers which may be used include asbestos, glass fibres, cotton, mineral wools, etc. Useful non-fibrous inorganic fillers include many materials that are commonly used as fillers in the plastic industry such as, for example, calcium carbonate, carbon, calcium sulphate, barium sulphate, silica, kaolin, fuller's earth, magnesium oxide and magnesium silicate. In addition, the resinous compositions may comprise plasticisers, stabilizers, lubricants of the kind commonly employed with vinyl chloride resins, as well as extenders, solvents, liquid fillers, gaseous fillers or binders and the like, of the kind commonly employed in the polyvinyl chloride area.

The invention is illustrated by the following examples to which it is not limited:

EXAMPLE 1

Precipitation polymerization in bulk (rectilinear magnetic stirring)

In a glass pressure tube which had been swept with nitrogen, a charge of monomers is introduced comprising in admixture a compound of group A, a compound of group B, a compound of group C and an initiator. The charge may be ready mixed or admixed in situ. After the introduction of the charge, the tube is again swept with nitrogen, closed and polymerization is performed under rectilinear magnetic stirring at a temperature of 35–65° C. The polymer formed is insoluble in the starting monomer mixture. After the completion of the reaction, the mixture is cooled and residual monomers are distilled off.

The above experiment is repeated with different monomer mixtures at different initiator levels, and blank tests are run with charges not including a group C compound. In each case, the polymer obtained is soluble in tetrahydrofuran. For purification, it is therefore dissolved in this solvent and re-precipitated with methanol, with methanol-HCl or with petroleum ether. After washing with methanol or with petroleum ether and drying in vacuum at 50° C., the intrinsic viscosity is measured in cyclohexanone at 25° C.

Details of various experiments conducted in this way and the results obtained are given in the following Table 2.

In this table, AIBN is azo-isobutyronitrile of the formula:

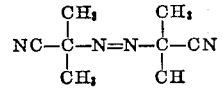

TABLE 2.—RESULTS OF POLYMERIZATIONS WITH AND WITHOUT COMPOUNDS OF GROUP C

| Exp. Number | Composition of feed (parts by weight) | | | Initiator used | Reaction conditions | | Yield, percent | Intrinsic viscosity at 25°C in cyclohexanone | Polymer composition | | |
|---|---|---|---|---|---|---|---|---|---|---|---|
| | Group A compound | Group B compound | Group C compound | | Temp., °C | Time, hours | | | Group A compound, percent Wt. | Group B compound, percent Wt. | Group C compound, percent Wt. |
| 1 | 93 vinyl chloride | 7 propylene | 0.5 acrylic acid | 0.2% AIBN | 65 | 19 | 77 | 0.60 | 95.5 | 3.8 | 0.65 |
| 2 | do | do | | 0.2% AIBN | 65 | 19 | 84 | 0.52 | 96 | 4.0 | 0 |
| 3 | 85 vinyl chloride | 15 propylene | | 0.2% AIBN | 65 | 19 | 55 | 0.44 | 91.5 | 8.5 | 0 |
| 4 | do | 15 propylene | 0.03 divinyl benzene | 0.2% AIBN | 65 | 19 | 56 | 0.55 | 91 | 8.4 | 0.35 |
| 5 | 95 vinyl chloride | 5 allylfluoride | 0.5 acrylic acid | 0.65% AIBN | 65 | 6½ | 23 | 0.61 | 93.8 | 4 | 0.2 |
| 6 | do | do | | 0.65% AIBN | 65 | 6½ | 41 | 0.55 | 96 | 4 | 0 |
| 7 | 86 vinyl chloride | 14 allylchloride | | 0.65% AIBN plus 4 hrs. sunlight | 35 | 23 | 57 | 0.58 | No analysis | | 0 |
| 8 | do | do | 0.5 acrylic acid | do | 35 | 18 | 63 | 0.62 | No analysis | | 0.8 |
| 9 | 93 vinyl chloride | 7 propylene | 0.1 1-3 butadiene | 0.5% AIBN | 65 | 1¼ | 83 | 0.73 | 96 | 3.6 | 0.3 |
| 10 | do | do | | 0.2% AIBN | 65 | 1¼ | 33 | 0.53 | No analysis | | 0 |
| 11 | do | do | 0.5 acrylic acid | 0.5% AIBN | 55 | 1¼ | 4.8 | 0.50 | No analysis | | |
| 12 | do | do | | 0.2% AIBN | 55 | 4 | 5.0 | 0.85 | No analysis | | 0.2 |
| 13 | do | do | 0.1 1-3 butadiene | 0.5% AIBN | 55 | 2½ | 4.5 | 0.52 | 95.9 | 3.9 | 0 |
| 14 | 92 vinyl chloride | 8 isobutylene | | 0.65% AIBN | 40 | 75 | 71 | 0.60 | 96.3 | 3.7 | 0 |
| 15 | do | do | 0.05 allylacryl amide | 0.65% AIBN | 40 | 75 | 37 | 0.55 | 95 | 4.5 | 0.12 |
| 16 | 93 vinyl chloride | 7 propylene | 0.03 divinyl benzene | 0.5% AIBN | 65 | 20 | 36 | 0.60 | 95.8 | 4.0 | 0.04 |
| 17 | do | do | 0.015 1-3 dimethyl 1-3 butadiene | 0.2% AIBN | 65 | 19 | 83 | 0.62 | 95.8 | 4.0 | 0.15 |
| 18 | 85 vinyl chloride | 15 propylene | 0.06 divinylbenzene | 0.5% AIBN | 50 | 42 | 61 | 0.59 | 91.4 | 8.5 | 0.04 |
| 19 | 93 vinyl chloride | 7 propylene | 0.5 itaconic acid | 0.2% AIBN | 65 | 18½ | 76 | 0.60 | 95.5 | 3.7 | 0.66 |

EXAMPLE 2

Bulk polymerization (Exp. 20)

In a glass pressure tube which had been swept with nitrogen, a charge of monomers was introduced which comprised in admixture 2 grams vinyl chloride, 8 grams allyl fluoride, 0.05 gram acrylic acid, and as an initiator 0.65% calculated on the monomers of AIBN. After the introduction of the charge, the tube was again swept with nitrogen, closed and the polymerization was performed under rectilinear magnetic stirring at 65° C. for 136 hours. At the end, the mixture was cooled, the remaining monomer was distilled off and a semi-solid polymer was taken out of the tube and dried in a vacuum at 60° C. The yield was 33% on total monomer.

The product contained 35.9% wt. bound VC, 62% wt. bound AF, 1.6 bound acrylic acid, the balance being made up of bound initiator fragments. The intrinsic viscosity was measured in cyclohexanone at 25° C. and was 0.14 dl./g. A solution could be prepared with 40% of the polymer in toluene or xylene.

A plate of copper was coated with a thin layer of this polymer from a 40% solution in toluene, then was stoved in air for 10 minutes at 170–175° C. in an oven. A film was obtained which was not sticky, showed excellent adhesion to the copper, good flexibility, chemical stability and xylene resistance.

EXAMPLE 3

Polymerization at low temperature (Exp. 21–22) (emulsion polymerization)

Two batches of copolymers were prepared in emulsion at about 11° C. in a 1 gallon blue-glass lined autoclave vertically stirred with an anchor-type stirrer driven by a ¼ HP motor.

The autoclave had a provision to measure the pressure and the temperature in the batch and the temperature in the cooling water.

The following additions were carried out under nitrogen in the order indicated.

(1) Soap solution consisting of:

| | |
|---|---|
| H₂O (distilled) | 1425 ml. |
| K laurate | 37.5 g. |
| Komplexon III [1] | 0.075 g. |
| Na dithionate | 0.1875 g. |
| Na₃PO₄·12H₂O | 5.25 g. | pH=10.0 adjusted with lauric acid.

(2) Activator solution:

| | |
|---|---|
| FeSO₄·7H₂O | 0.9 g. |
| Komplexon III [1] | 1.125 g. |
| Sodium formaldehyde sulfoxylate | 2.25 g. |
| H₂O (distilled) | 75 ml. |

(3) Monomers and initiator:

| | |
|---|---|
| Group A compound=vinyl chloride | 662 ml. (600 g.). |
| Group B compound=propylene | 292 ml. (150 g.). |
| Group C compound=butadiene | 1.1 ml. (0.75 g.). |
| Initiator=p-menthane hydroperoxide | 5.4 ml. (as 53% solution). |

[1] Disodium dihydrogen ethylene diamine tetraacetate dihydrate.

In the second of the two runs (called blank), compound C was omitted.

The monomer feed was introduced from calibrated glass pressure bottles protected by cages of perforated steel plate, through ⅛″ feed inlet tubes. During polymerization the autoclave contents were stirred at 350 r.p.m. and cooled by pumping ice-water through the autoclave jacket by means of a centrifugal pump. The temperature inside the autoclave was about 11° C. (±2° C.) and the pressure 5.6 to 6.2 atmospheres.

The polymerization was ended after about 4½ hours by venting off the remaining, unconverted monomers through the feeding pipe. Then the discharge flange was opened and a dip tube was introduced through the discharge flange. The lattices obtained were removed from the autoclave via the discharge dip tube by applying nitrogen pressure to the feed-tube.

The products were coagulated and washed with methanol containing some Komplexon III and washed successively with an aqueous Komplexon III solution, with 0.2% HCl (pH=2), with water containing some Komplexon III until neutral and finally with methanol. The products were dried at 60° C. under 10–20 mm. Hg pressure.

In the dried samples the bound vinyl chloride was determined by elementary analysis of chlorine and the intrinsic viscosity in cyclohexanone at 30° C. The results were as follows:

|  | Run 1 (Exp. 21) | Run 2 (Exp. 22) |
|---|---|---|
| Temperature inside autoclave | 11° C | 12° C. |
| Time of polymerization | 4½ hours | 4¾ hours. |
| Group A compound | 600 g. vinyl chloride | 600 g. vinyl chloride. |
| Group B compound | 150 g. propylene | 150 g. propylene. |
| Group C compound | 0.75 g. butadiene | None. |
| Conversion to polymer | 53% | 50%. |
| Bound vinyl chloride | 91.4% wt | 92.0% wt. |
| Bound butadiene | 0.2% wt | 0. |
| Bound propylene | 8% wt | 8% wt. |
| Intrinsic viscosity, dl./g.—measured in cyclohexanone at 30° C. | 0.74 | 0.57. |

The sample prepared in the presence of group C compound had a higher intrinsic viscosity of 0.74 dl./g. The addition of group C compound did not lead to a reduction in the rate of polymerization which was about 11% per hour in both cases. The products were easily processible on a mill without discolouration.

The milling behaviour was also compared for the emulsion polymerized compound of Exp. No. 21 and of a copolymer of the same IV[1] but lower propylene content (4% P) without bound butadiene using as formulation:

|  | Grams |
|---|---|
| Resin | 40 |
| Stabilizer (barium cadmium) "Advances Advastab" BC–100 | 0.96 |
| Chelator: Argus Mark C (organic phosphite) | 0.32 |
| Epoxidized soyabean oil: Advances Advaplas 39 | 1.2 |
| Lubricant: Wax E (from Hoechst) | 0.24 |

The sample was prepared on a 6" x 3.5" electrically heated two roll mill with a constant friction ratio between the front and back rolls of 1.375. The temperature of milling was so chosen that the resin did not melt on the rolls but merely became soft enough to be mixed without difficulty.

The initial roll gap was 0.25 mm. during 1 minute. Thereafter the gap was opened to 0.40 mm. for mixing for a period of 6 minutes. The mixture was then allowed to roll unmixed for 3 minutes at a gap size of 0.35 mm.

The same Exp. No. 21 showed an excellent milling

[1] IV = Intrinsic viscosity.

stability and the milling temperature was 132° C. (front roll) which was 23° C. lower than with the sample of 96% w. VC content and 4% w. P content and of the same IV[1]. Hence the high propylene content high IV[1] sample prepared according to the present invention shows an excellent milling processability. The excellent mill stability may be due in part to the reduced milling temperature of the high propylene sample containing bound butadiene as a chain extender.

EXAMPLE 4

Precipitation polymerization in bulk (Exp. 23–24)
(end-over-end rotation)

In a glass pressure tube which has been swept with nitrogen, a charge was introduced comprising vinyl chloride, 9.3 g., propylene 0.7 g., allyl acrylate 0.01 g. and as an initiator azo-bis-isobutyro-nitrile (AIBN) 0.02 g.

After the introduction of the charge, the tube was closed and polymerization was performed under end-over-end rotation at a temperature of 65° C. The solid polymer formed was insoluble in the monomer mixture, giving precipitation polymerization.

After 24 hours the mixture was cooled and the residual monomers were distilled off.

The experiment was repeated with a blank test with a charge not including allyl acrylate. The products were soluble in tetrahydrofuran. They were dissolved in this solvent and reprecipitated with methanol. After washing with methanol and drying in a vacuum at 60° C. the intrinsic viscosity (I.V.) was measured in cyclohexanone at 25° C.

Details of the experiments are given in Table 3.

TABLE 3

Feed: 93% w./w. vinyl chloride, 7% w./w. propylene
Temperature: 65° C.
Time: 24 hours

| Initiator | | Group C compound | | Yield | I.V. | Bound propylene, Percent wt. | Bound allyl acrylate, percent wt. | Bound vinyl chloride, percent wt. | Solubility polymer in tetrahydrofuran |
|---|---|---|---|---|---|---|---|---|---|
| Type | Percent wt. | Type | Percent wt. | Percent | Dl./g. | | | | |
| AIBN | 0.2 | Allyl acrylate | 0.1 | 70 | 0.65 | 2.8 | 0.14 | 97 | Soluble. |
| AIBN | 0.2 | None | 0 | 75 | 0.53 | 2.7 | 0 | 97 | Do. |

EXAMPLE 5

Suspension polymerization

Suspension polymerizations were carried out at 60° C. in a 1½ litre glass pressure reactor fitted with a rectangular blade stirrer operating at 800 r.p.m. A solution of suspending agents in de-aerated distilled water was placed in this reactor; then the initiator and group C compounds were added, the reactor was closed and flushed with nitrogen. Liquid vinyl chloride and propylene were then entered into the reactor in that order under nitrogen pressure. Stirring was started and the reactor was heated to the operating temperature of 60° C. After 13 hours at 60° C. heating was stopped and the reactor was allowed to cool overnight while stirring continued. The excess gases were vented off, the polymer removed, washed with distilled water and dried with air at 60° C. by the fluidized bed technique.

The following suspension recipes were used:

|  | Recipe I (in grams) | Recipe II (in grams) |
|---|---|---|
| Vinyl chloride (group A compound) | 308 | 276 |
| Propylene (group B compound) | 22.3 | 58 |
| Water | 620 | 620 |
| Sodium tripolyphosphate | 0.70 | 0.70 |
| Methocel 65 Hg-50 cps. (a water soluble cellulose methyl ether—Dow Chemicals) | 0.44 | 0.44 |
| Tensaktol A (Na salt of di-decyl di-sulphon-imide as a 65% aqueous solution) | 0.10 | 0.10 |
| Mg sulphate hepta-hydrate | 0.70 | 0.70 |
| Dilauroyl peroxide | 1.00 | 1.00 |
| Group C compound | (1) | (1) |

[1] As indicated.

Comparison blanks were run under identical conditions but with exclusion of the group C compound. The results are given in Table 4.

EXAMPLE 7

Incremental addition of compound C (Exp. 38 and 39) in five steps

A suspension polymerization was carried out in the same 1½ litre glass pressure reactor as described in part A of Example 5. Recipe II was used, but with the difference that the group C compound, allyl acrylate, in a total amount of 0.062% weight was added in 5 equal increments over a total period of 5 hours from the initial moment of the polymerization. The total polymerization time was 13 hours and the temperature 60° C.

The yield of polymer was .23%. This polymer did contain 7.5% w. bound propylene, 0.27% w. bound allyl acrylate and its intrinsic viscosity was 0.51 dl./g.[1]

The blank run had an intrinsic viscosity of 0.40 dl./g. and bound propylene content of 7.5 wt. percent.

EXAMPLE 8

Low temperature polymerization (suspension polymerization)

Suspension polymerizations were carried out in the same 1½ litre glass pressure reactor, but with the differ-

TABLE 4

| Experiment number | Recipe used | Group C compound used | Group C compound concentration, wt. percent of all monomers | Yield, percent | Polymer properties | | | |
|---|---|---|---|---|---|---|---|---|
| | | | | | Intrinsic viscosity, dl./g.[1] | Wt. percent bound | | |
| | | | | | | Propylene | Vinyl chloride | Group C compound |
| 25 | I | Blank | None | 68 | 0.59 | 3.6 | 95.5 | 0 |
| 26 | I | do | None | 66 | 0.63 | 3.1 | 96 | 0 |
| 27 | I | Allyl acrylate | 0.03 | 70 | 0.72 | 3.5 | 95 | 0.043 |
| 28 | I | Allyl methacrylate | 0.014 | 70.5 | 0.65 | 3.5 | 95.5 | 0.019 |
| 29 | II | Blank | None | 25 | 0.40 | 7.5 | 92 | 0 |
| 30 | II | do | None | 24.7 | 0.40 | 7.7 | 91.5 | 0 |
| 31 | II | Allyl acrylate | 0.03 | 27 | 0.48 | 7.3 | 92 | 0.11 |
| 32 | II | Allyl methacrylate | 0.014 | 25.3 | 0.45 | 7.1 | 92 | 0.055 |
| 33 | II | do | 0.028 | 26.2 | [2] 0.58 | 7.5 | 91.5 | 0.17 |
| 34 | II | Diallylitaconate | 0.010 | 21.3 | 0.42 | 7.5 | 91 | 0.050 |
| 35 | II | do | 0.015 | 25.8 | 0.46 | 7.5 | 91 | 0.054 |

[1] Measured in cyclohexanone at 30° C.
[2] Small amounts of gel are present.

EXAMPLE 6

Suspension polymerisation—addition of compound C in two steps

Suspension polymerization was carried out in the same 1½ litre pressure reactor as described in Example 5, but with the difference that recipe II was used, that the 1.00 g. dilauroyl peroxide was omitted and instead were introduced 0.51 gram of solution of 30% $H_2O_2$ and 10 cc. NaOH 1 N which were both added with the water and 0.8 cc. ethyl chloroformate, which was dissolved in the group A and group B compound.

Two runs were performed at 60° C., during 13 hours, in the presence or absence of group C compound (allyl acrylate). The results are given in Table 5.

ence that the stirrer was operating at 500 r.p.m. Recipe II was used, but with the variations that the 0.44 gram methocel 65 Hg-50 cps. was replaced by 0.44 gram methocel 90 Hg-100 cps. and furthermore the 1.0 g. of dilauroyl peroxide was omitted and instead were introduced 4.65 g. of a solution of 3.27% $H_2O_2$ and 9 cc. NaOH 1 N which both were added with the water and 1.19 cc. isobutyl chloroformate dissolved in the group A and B compounds. Two runs were performed at 30° C. for 20 hours in the presence or absence of group C compounds.

Trace gel present.

TABLE 5

| Exp. number | Group C type | Compound concentration, percent wt. of total monomer | Yield, percent | Bound propylene, percent wt. | Bound VC, percent wt. | Bound allyl acrylate, percent wt. | Intrinsic viscosity (IV), dl./g. |
|---|---|---|---|---|---|---|---|
| 36 | None | 0 | 45.3 | 7.8 | 92 | 0 | 0.35 |
| 37 | Allyl acrylate | [1] 0.06 | 47 | 8.0 | 91.5 | 0.13 | 0.39 |

[1] Half of this was added initially, the other half after 3 hours.

TABLE 6

| Exp. number | Temp., °C. | Group C compound Type | Concentration, percent wt. of total monomer | Yield, percent | Bound vinyl chloride, percent wt. | Bound propylene, percent wt. | Bound allyl acrylate, percent wt. | Intrinsic viscosity dl./g. |
|---|---|---|---|---|---|---|---|---|
| 40 | 30 | None | 0 | 19 | 94 | 5.8 | 0 | 0.73 |
| 41 | 30 | Allyl acrylate | 0.03 | 20 | 93.5 | 6.0 | 0.15 | 0.83 |

EXAMPLE 9

Dynamic processability testing of products

The dynamic processability was measured for five tin stabilized rigid compounds in a test at about 190° C. in the Brabender Plastograph (OHG, Duisburg, Germany). A roller mixer head type 30 was used at a speed of 63/42 r.p.m. with a fixed jacket temperature of 190° C. The formulation used was:

```
                                                     G.
Tin stabilizer, Mark 292 _____   1
Stearic acid _____   0.176
Resin _____  34
```

The results are given in Table 7.

creased (lower torque). The stability is also improved and this is due in part to the reduced torque.

EXAMPLE 10

Thermal stability of products

Two sheets were prepared in a hydraulic press at 75 atmospheres during 10 seconds from two powders prepared in the absence of a stabilizer; one of vinyl chloride polymer prepared in the presence of 0.09% allyl acrylate (AA) containing 0.1% bound allyl acrylate ($S_1$) and one of a vinyl chloride propylene polymer prepared in the presence of 0.03% allyl acrylate but containing 7.3% propylene and 0.1% bound allyl acrylate ($S_2$).

TABLE 8

| Experiment number | Sample tested | Group C compound | Bound propylene, percent wt. | Intrinsic viscosity, dl./g. | Colour after pressing |
|---|---|---|---|---|---|
| 47 | $S_1$ | 0.1% AA | 0 | [1] 1.6 | Strong purple discoloration. |
| 48 | $S_2$ | 0.1% AA | 7,3 | 0.48 | Virtually colourless. |

[1] After removal of gel.

TABLE 7.—DYNAMIC PROCESSABILITY OF PRODUCTS—BRABENDER RESULTS

| Group | Exp. number | Initiator Type | Initiator Amount | Polymerization temp., °C. | Intrinsic viscosity (IV), dl./g.[a] | Propylene in product, percent wt. | Chain extender in— Feed, percent on monomer | Chain extender in— Product | Brabender results Minimum torque, mg. | Brabender results Time to degrade, minutes | Brabender results Temperature of melt, °C. | DPI[b] |
|---|---|---|---|---|---|---|---|---|---|---|---|---|
| I | 42 | Et[d] | 0.2 | 60 | 0.39 | 8.0 | AA,[e] 0.06 [c] | 0.13 | 130 | 100 | 171 | 7,020 |
| I | 43 | Et[d] | 0.3 | 50 | 0.44 | 7.9 | None | 0 | 330 | 53 | 172 | 1,864 |
| I | 44 | Et[d] | 0.45 | 50 | 0.43 | 7.8 | do | 0 | 325 | 84 | 172 | 2,867 |
| I | 45 | DLP[f] | 0.3 | 60 | 0.48 | 7.3 | AA,[e] 0.03 | 0.11 | 290 | 90 | 173 | 4,290 |
| I | 46 | Et[d] | 0.24 | 50 | 0.45 | 7.5 | None | 0 | 360 | 75 | 173 | 2,531 |

[a] In cyclohexanone at 25° C.
[b] DPI=dynamic processability index given by:

$$DPI = \frac{t \times n^2}{T}$$

where t=time to degrade in seconds; n=intrinsic viscosity; T=torque of decomposition in kg. meters. The higher the DPI value the easier the resin lends itself to processing.
[c] Two-step addition of allyl acrylate (AA), 50% initially, 2d increment after 3 hours.
[d] Et=di-ethylperoxy dicarbonate in situ.
[e] AA=allyl acrylate.
[f] DLP=dilaurylperoxide.

Table 7 contains results of two groups of polymers, Group I and Group II. In each group the polymers have about the same IV and propylene content:

(viz P=7.8–8.0% w. for Group I, and P=7.3–7.5% w. for Group II)

In each group the properties are compared to polymers in which the chain extensions to give IV increase was achieved by two different techniques, (1) reduction in temperature of polymerization (2) the use of allyl acrylate (AA) as a chain extender. The advantages of chain extension by AA over reducing the polymerization temperature is clearly apparent. It can be seen that the materials produced by the use of chain extender AA have a lower torque and are therefore better processable than materials with the smaller IV and P content but prepared by reducing the polymerization temperature.

By the use of chain extender the processability is in-

The first pressed sample $S_1$ did show a strong purple discoloration, whereas sample $S_2$ was virtually colourless. This test shows that the poor thermal stability under moulding conditions of a vinyl chloride-allyl acrylate copolymer is greatly improved by the incorporation of bound propylene.

What is claimed is:
1. A free radical initiated solid addition interpolymer consisting of:
   (a) from 20 to 98% by weight of at least one monomeric compound selected from the group consisting of vinyl chloride and vinyl fluoride (group A compound);
   (b) from 5% to 100 p.p.m. by weight of at least one monomeric compound characterized by having at least two polymerizable double bonds which may either be conjugated with each other or alternatively one of which may be in conjugation with another non-polymerizable double bond and which is asymmetrically substituted and by having a reactivity ratio $r_2$ relative to said group A compound larger than 3 and reactivity ratio $r_1$ relative to group A compound smaller than 0.5 (group C compound); and (c) at least one monomeric compound, in an amount greater than the amount of said group C compound and sufficient to make 100%, selected from the group consisting of propylene, isobutylene, 1-butene, methylpentenes, amylenes and allyl halides (group B compound);

said interpolymer having an extended branched chain structure.

2. An interpolymer according to claim 1, wherein said group C compound is a conjugated nitrogen-vinyl compound.

3. An interpolymer according to claim 1, wherein said group C compound is an acrylic acid ester of the formula

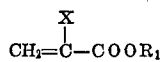

$$CH_2=C-COOR_1$$

wherein $R_1$ is an unsaturated hydrocarbon radical and X is a member selected from the group consisting of hydrogen, $CH_3$ and $-CH_2CO \cdot OR_2$ wherein $R_2$ is a saturated or terminally unsaturated hydrocarbon radical.

4. An interpolymer according to claim 1, wherein said group C compound is a member selected from the group consisting of di- and tri-vinyl substituted dicyclic and tricyclic homocyclic and heterocyclic aromatic compounds.

5. An interpolymer according to claim 1, wherein said group C compound is a 1,3-diene compound.

6. An interpolymer according to claim 1, wherein said group A compound is vinyl chloride and said group B compound is propylene.

References Cited
UNITED STATES PATENTS

| | | | |
|---|---|---|---|
| 2,377,753 | 6/1945 | Brubaker | 260—86 |
| 2,777,833 | 1/1957 | Richard | 260—87.7 |
| 3,117,110 | 1/1964 | Madge et al. | 260—86.7 |
| 3,236,824 | 2/1966 | Wilhjelm | 260—88.2 |
| 3,241,600 | 3/1966 | Whitehouse | 159—58 |
| 3,261,888 | 7/1966 | Cornell et al. | 260—87.7 |
| 3,278,495 | 10/1966 | Hagel et al. | 260—78.5 |
| 3,284,422 | 11/1966 | Chadha | 260—80.5 |
| 3,380,974 | 4/1968 | Stilmar | 260—80.8 |
| 3,436,380 | 4/1969 | Davison | 260—80.78 |
| 3,481,908 | 12/1969 | Mortimer | 260—80.73 |
| 3,084,136 | 4/1963 | Chapin et al. | 260—45.2 |
| 3,530,104 | 9/1970 | Farber et al. | 260—80.81 |
| 3,642,732 | 2/1972 | Yasumura et al. | 260—80.81 |
| 3,501,440 | 3/1970 | Kamio et al. | 260—77.5 |
| 3,609,131 | 9/1971 | Lalet et al. | 260—80.7 |

JOSEPH L. SCHOFER, Primary Examiner

S. M. LEVIN, Assistant Examiner

U.S. Cl. X.R.

260—32.8 R, 33.6 UA, 66, 73 R, 78.5 R, 80.72, 80.73, 80.75, 80.77, 80.78, 80.8, 80.81